United States Patent [19]

King

[11] 4,284,252
[45] Aug. 18, 1981

[54] CARTRIDGE FOR STRIP CHART RECORDERS AND METHOD OF USING SAME

[75] Inventor: Phillip W. King, Cheshire, Conn.

[73] Assignee: American Home Products Corporation, New York, N.Y.

[21] Appl. No.: 99,169

[22] Filed: Nov. 30, 1979

[51] Int. Cl.³ .................. G03B 1/04; G11B 15/32
[52] U.S. Cl. .................................. 242/198; 226/167
[58] Field of Search .............. 242/198, 55, 55.2; 346/136, 145; 226/167

[56] References Cited

U.S. PATENT DOCUMENTS

| | | | |
|---|---|---|---|
| 3,713,170 | 1/1973 | Kaufman | 346/136 |
| 3,717,881 | 2/1973 | Bunting | 346/136 |
| 3,731,318 | 5/1973 | Dickey | 346/145 |
| 3,778,842 | 12/1973 | Saito | 346/136 |
| 3,787,886 | 1/1974 | McCrady | 226/167 X |
| 3,922,688 | 11/1975 | Bates et al. | 346/136 |
| 4,190,848 | 2/1980 | Curran | 346/145 |
| 4,218,031 | 8/1980 | Camier et al. | 242/67.3 R |

Primary Examiner—Leonard D. Christian
Attorney, Agent, or Firm—Eugene L. Flanagan, III

[57] ABSTRACT

A cartridge for supplying a record medium to a strip chart recorder and method of using the same therewith. A pivoting member of the cartridge is engaged with a support member of the mechanism; the cartridge is pivoted about the support member into an operative position in the mechanism; and the cartridge is releasably secured against disengagement from the operative position.

12 Claims, 6 Drawing Figures

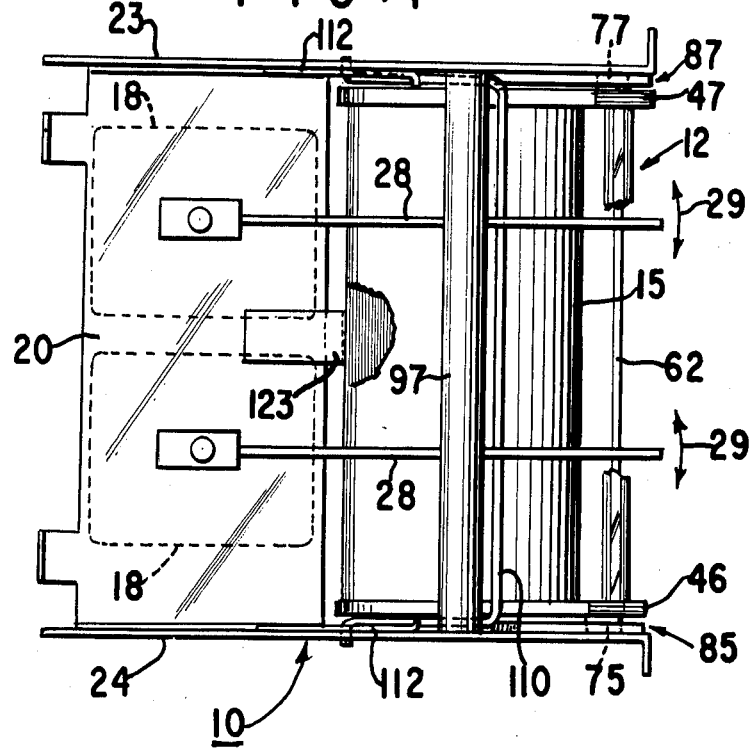
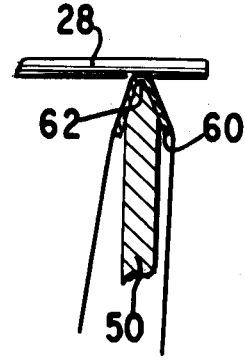
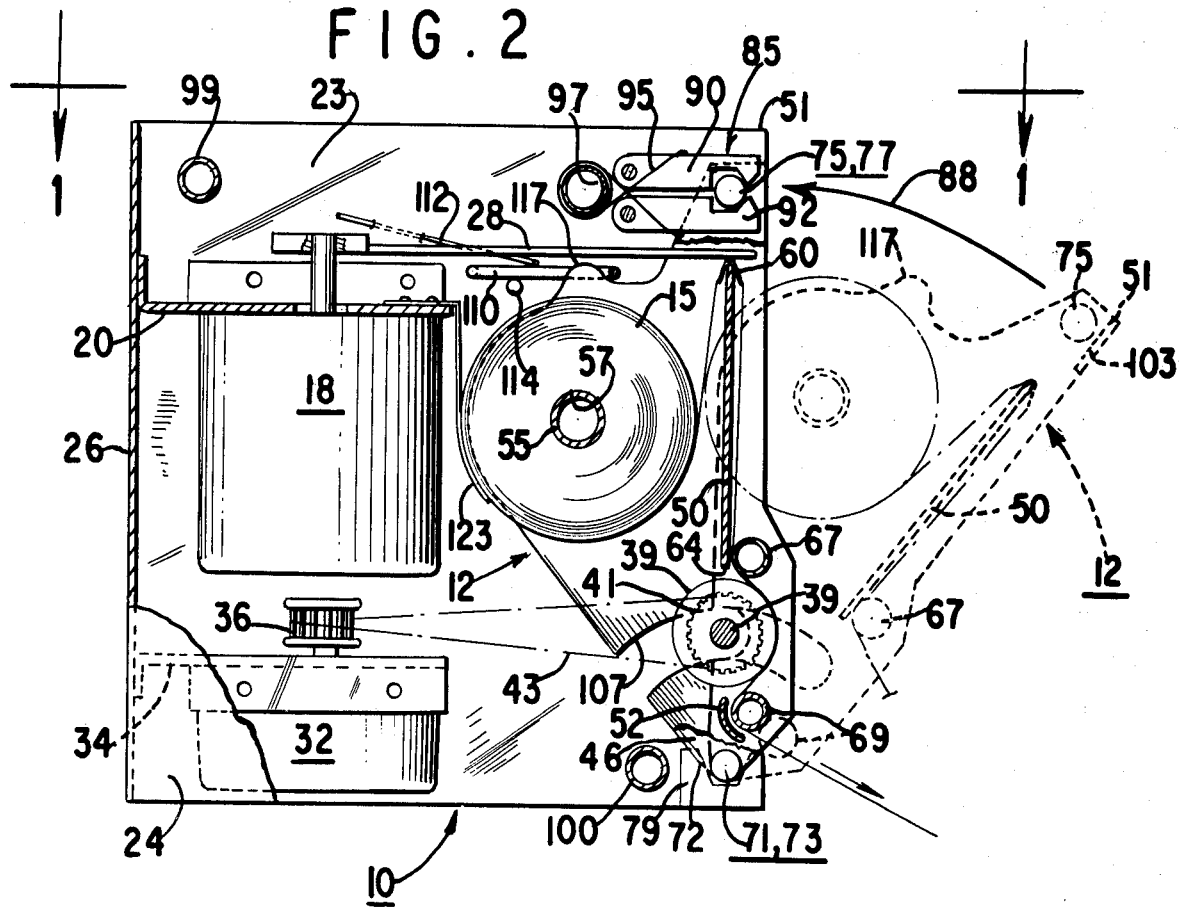

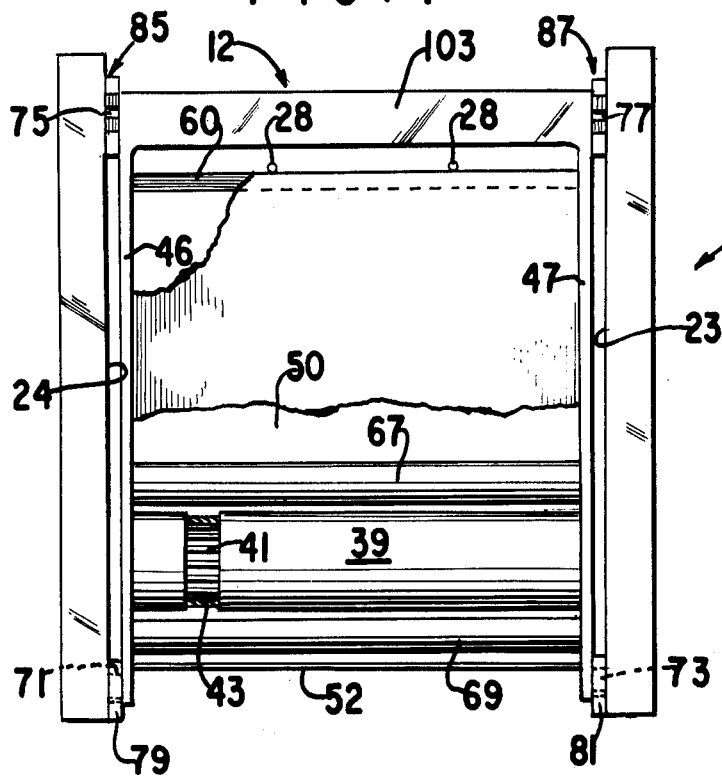
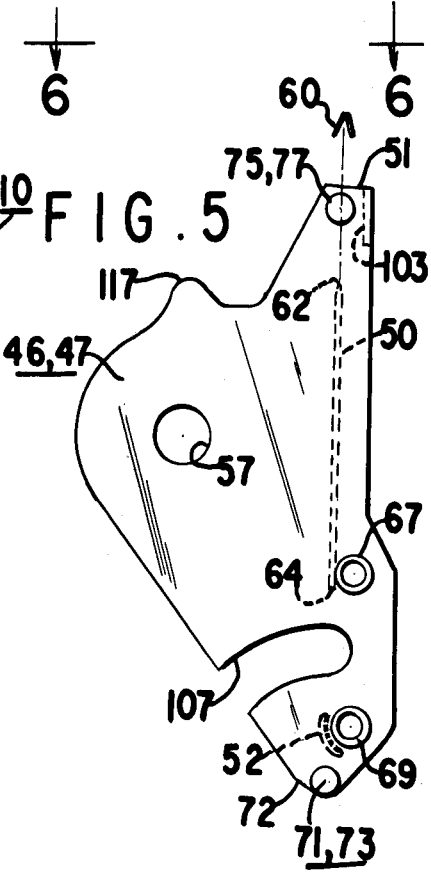
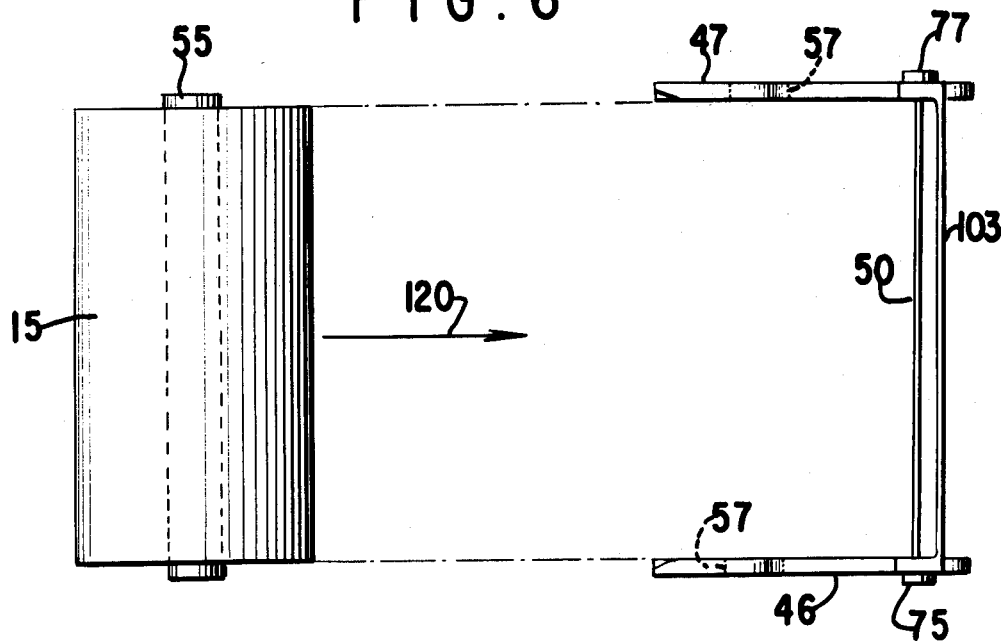

CARTRIDGE FOR STRIP CHART RECORDERS AND METHOD OF USING SAME

BACKGROUND

The present invention relates to strip chart recorders wherein the record medium is supplied in cartridge form.

In all of the diverse fields in which strip chart recorders for an application for recording a time varying signal, ease of loading the record medium into the recorder is an important consideration for the operator. In some fields, such as fetal monitoring, ease of operation is essential where busy medical personnel are preoccupied with patient care.

SUMMARY OF THE INVENTION

The present invention provides a cartridge for supplying a record medium to a recording device, such as a strip chart recorder. The cartridge comprises a frame which is adapted to be mounted releasably in the recording device. A supply of the record medium is supported by the frame to be dispensed therefrom. A securing means on the frame is adapted to releasably engage the recording device to maintain the cartridge in operative relation therewith. The securing means comprises a first support boss for engaging a support socket of the recording device and a second support boss spaced from the first support boss for engaging a latch of the recording device to support the first boss in the support socket. Accordingly, the operator is able to load the cartridge in the recording device by engaging both support bosses therewith, without additionally having to thread the recording medium through the drive mechanism or perform additional, distracting and time consuming operations.

In accordance with a method for mounting a cartridge carrying a record medium in a strip chart recorder, a pivoting member of the cartridge is engaged with a support member of the mechanism. The cartridge is pivoted about the support member into an operative position in the mechanism. The cartridge is then releasably secured against disengagement from the operative position therein. In a preferred aspect of the method, the pivoting member of the cartridge is engaged with the support member by passing the pivoting member through an aperture of the support member into a socket thereof. Then a hold member on the cartridge is releasably engaged in a latch means of the recorder, such that motion of the pivoting member from the support means through the aperture is resisted while the hold member is engaged by the latch means.

In accordance with a further aspect of the present invention, a strip chart recorder is provided having means for releasably holding a cartridge containing a record medium. The recorder further comprises means for advancing the record medium past a recording site; recording means for engaging the record medium at the recording site to produce a record on the record medium; and a displacement means for temporarily removing the recording means from the recording site upon insertion of the cartridge into the strip chart recorder. In a preferred embodiment of the strip chart recorder, the displacement means comprises a cam follower positioned to engage a cam member of the cartridge and deflect the recording means from the recording site in response to a deflecting force exerted through the cam member upon insertion of the cartridge into the strip chart recorder. This avoids damaging the recording means, which frequently is a delicate instrument.

In accordance with yet a further embodiment of the present invention, a strip chart recorder comprises a recording means for producing a record on a record medium; advancing means for moving the record medium past the recording means; and cartridge securing means for releasably securing a cartridge carrying the record medium. The cartridge securing means comprises support means for supporting a pivoting member of the cartridge such that the cartridge is pivotable into an operative position in the strip chart recorder; and latch means for engaging a hold member on the cartridge upon pivoting of the cartridge into operative position such that the pivoting member of the cartridge is releasably secured against disengagement with the socket. In a preferred embodiment, the support means comprises a socket having an aperture facing the latch means and the latch means is operative to resist motion of the pivoting member of the cartridge from the support means through the aperture while the hold member is engaged by the latch means.

BRIEF DESCRIPTION OF THE DRAWINGS

FIG. 1 is a view taken along line 1-1 in FIG. 2, looking down on a strip chart recorder, partially cut away, and a cartridge carrying a roll of strip chart paper mounted in operative position therein.

FIG. 2 is a side elevational view of the apparatus of FIG. 1, partially cut away, and illustrating a method of inserting the cartridge therein.

FIG. 3 is a partial sectional view showing the manner in which a printing stylus of the strip chart recorder engages the strip chart paper to make a record thereon.

FIG. 4 is a side elevational view of the cartridge, partially broken away, showing the manner in which a drive roll of the strip chart recorder is positioned with respect to a pair of tension rollers disposed in the cartridge when the latter is in operative position in the strip chart recorder.

FIG. 5 is a side elevational view of the cartridge;

FIG. 6 is a view taken along lines 6-6 of FIG. 5, illustrating the manner in which the roll of chart paper is inserted in the cartridge.

DETAILED DESCRIPTION OF PREFERRED EMBODIMENTS

Certain preferred embodiments of the present invention will be described for use with a two-channel strip chart recorder wherein conventional pen motors drive heated stylus pens to create a record on strip chart paper as it is advanced over a record site in the form of a knife edge support.

With reference to FIGS. 1 and 2 a strip chart recorder 10 is shown with a cartridge 12 carrying a roll of strip chart paper 15 mounted in operative position therein. The recorder 10 includes two high torque, low hysteresis pen motors 18 which are conventional. Pen motors 18 are mounted on a bracket 20 which in turn is mounted on two opposing side walls 23 and 24 of the recorder 10 and on a rear wall 26 of recorder 10. Three support posts 97, 99 and 100 span sidewalls 23 and 24 and maintain them in a predetermined, spaced relationship. Each of pen motors 18 has a pen arm 28 pivotably mounted thereon and driven thereby to traverse an arc movement (indicated by arrow 29) over the strip chart paper as it is advanced past a recording site by a drive means of the strip chart recorder, described herein below.

The strip chart recorder 10 further includes such a drive means comprising a conventional chart drive motor 32 mounted on a bracket 34 which in turn is mounted on rear wall 26 and on side walls 23 and 24. The chart drive motor 32 includes a drive sprocket 36 which is driven to rotate about a vertical axis at a predetermined rate by motor 32. The drive means of the strip chart recorder further includes a drive roller 39 mounted horizontally on a freely rotatable shaft 38 journaled in sidewalls 23 and 24 for rotation in a front aperture of the strip chart recorder 10. Drive roller 39 has a recessed sprocket 41 which engages a timing belt 43 secured to drive sprocket 36 of chart drive motor 32. Since drive sprocket 36 of motor 32 is disposed to rotate about an axis in a vertical plane, timing belt 43 has a 90° twist to convert the rotational movement of sprocket 36 in the vertical plane to rotate drive roller 39 on its shaft 38 mounted in a horizontal plane.

With reference particularly to FIGS. 1, 2 and 4, the cartridge 12 further comprises a frame having opposed sidewalls 46 and 47 secured in parallel, spaced relation by a guide wall 50 and a deflecting member 52. The roll of strip chart paper 15 is mounted on an axis 55 journaled in respective apertures 57 in opposed sidewalls 46 and 47 such that axis 55 is freely rotatable therein. The roll of paper 15 is mounted in cartridge 12 adjacent a rear surface of guide wall 50. A metal printing edge 60 in the form of a generally elongated, V-shaped or U-shaped piece of sheet metal is affixed to a first edge 62 of guide wall 50 which extends horizontally adjacent the top edge 51 of cartridge 12 when cartridge 12 is mounted in the recorder 10. Strip chart paper from the roll 15 is threaded at the time the cartridge is assembled around printing edge 60 and over a front surface of guide wall 50 in opposed, parallel relation with the rear surface of guide wall 50. A second edge 64 of guide wall 50 is disposed vertically below first edge 62 in opposed spaced relation therewith. A first tension roll 67 spans opposed sidewalls 46 and 47 in which it is journaled for free rotation. First tension roll 67 is positioned adjacent second edge 64 of guide wall 50 to define a narrow gap with the front side of guide wall 50. A second tension roll 69 also spans opposed side walls 46 and 47 and is journaled in each for free rotation. Second roll 69 is positioned adjacent a forward, concave surface of deflecting member 52 to define a narrow gap therebetween. The strip chart paper from roll 15 after it passes over the front surface of guide wall 50 is threaded between first tension roll 67 and the front surface of guide wall 50 adjacent second edge 64 through the narrow gap defined thereby. Then the paper is threaded between second tension roll 69 and deflecting member 52 in the narrow aperture defined thereby. The concave surface of deflecting member 52 faces outwardly from the strip chart recorder 10 when the cartridge 12 is mounted therein to deflect the paper from between the concave surface of member 52 and second roll 69 outwardly from the recorder 10.

A preferred method for mounting the cartridge 12 into and securing it in the recorder 10 will now be described. A first guide boss 71 having a cylindrical shape is formed on an outer surface of sidewall 46 of the cartridge which faces away from sidewall 47, and adjacent the bottom edge 72 of cartridge 12, as viewed from in front of recorder 10 when cartridge 12 is mounted therein. A second cylindrical guide boss 73 is formed on an outer surface of sidewall 47 of cartridge 12 which faces away from sidewall 46, and adjacent the bottom edge 72 of cartridge 12, such that when cartridge 12 is mounted in operative position in recorder 10, first guide boss 71 is aligned horizontally with second guide boss 73. A first latch boss 75 having a cylindrical shape is formed on the outer surface of sidewall 46 of the cartridge 12 adjacent the top edge 51, and a second latch boss 77 having a cylindrical shape is formed on the outer surface of sidewall 47 also adjacent the top edge 51 of cartridge 12, such that when cartridge 12 is disposed in operative position in recorder 10 first latch boss 75 is horizontally aligned with second latch boss 77.

A support means of strip chart recorder 10 for supporting first and second guide bosses 71 and 73 for pivotal movement about a horizontal axis includes a first cartridge guide 79 mounted on sidewall 24 adjacent the front of strip chart recorder 10 and a second cartridge guide 81 affixed to sidewall 23 likewise adjacent the front of recorder 10. Strip chart recorder 10 further comprises a latch means which is positioned to engage first and second latch bosses 75 and 77 of cartridge 12 and releasably secure them therein when the cartridge 12 is pivoted about first and second guide bosses 71 and 73 into an operative position in strip chart recorder 10. Accordingly, the latch means includes a first latch 85 affixed to the inside surface of sidewall 24 adjacent the front of strip chart recorder 10 and a second latch 87 affixed to the inside surface of side wall 23 adjacent the front of strip chart recorder 10, such that as cartridge 12 is pivoted about first and second guide bosses 71 and 73 disposed in first and second cartridge guides 79 and 81, respectively, (as indicated by arrow 88) first and second latch bosses 75 and 77 are brought into a position to engage first and second latches 85 and 87, respectively, and are releasably secured thereby. Each of first and second cartridge guides 79 and 81 has a socket sized to retain guide bosses 71 and 73 for pivotal movement, each socket having an aperture facing a respective one first and second latches 85 and 87 permitting guide bosses 75 and 77 to be inserted into the respective socket of cartridge guides 79 and 81. Preferably, each of cartridge guides 79 and 81 is provided with a curved extension positioned to intercept the guide boss at the front of recorder 10 and direct it into the socket.

Each of first and second latches 85 and 87 has two opposed retaining arms 90 and 92 mounted on the respective one of sidewalls 24 and 23 for pivotal movement in a vertical plane toward or away from a latching position. Opposed retaining arms 90 and 92 are biased towards a latching position by a wire spring 95 mounted on support post 97. Opposed retaining arms 90 and 92 are aligned generally perpendicularly to the front of recorder 10. A cam surface on each of retaining arms 90 and 92 adjacent the front of recorder 10 is positioned to intercept the respective one of first and second latch bosses 75 and 77 and deflect its respective latch arm away from the other to permit the latch boss to pass therebetween. Inwardly of the cam surface of each retaining arm 90 and 92 is a notch opposing a corresponding notch in the other retaining arm. A forward surface of each notch is formed as a cam surface to urge the latch boss inwardly into its respective notch due to the force exerted by wire spring 95 tending to close the opposed retaining arms. Accordingly, the respective latch boss will be releasably secured between the retaining arms to maintain the cartridge in operative position in recorder 10. It will be appreciated that first and second guide bosses 71 and 73 will be held in cartridge guides 79 and 81, respectively, due to the force exerted by wire spring 95 through retaining arm 90. The cartridge may be withdrawn from the recorder 10 by pulling the latch bosses 75 and 77 against the inner cam surface of each of opposed arms 90 and 92 thus to separate the arms against the force of wire spring 95.

Cartridge 12 is provided with a handle 103 in the form of a bar spanning the inner surfaces of opposed sidewalls 46 and 47 adjacent top edge 51. Accordingly, the operator would engage cartridge 12 in operative position in recorder 10 by first inserting guide bosses 71 and 73 in cartridge guides 79 and 81, respectively; pivoting cartridge 12 about guide bosses 71 and 73 into recorder 10 (as indicated by arrow 88 of FIG. 2) and pushing against handle 103 to force first and second latch bosses 75 and 77 between retaining arms 90 and 92 of first and second latches 85 and 87, respectively, to releasably secure bosses 75 and 77 therein.

With reference particularly to FIGS. 2 and 4, tension rolls 67 and 59, together with the second edge 64 of guide wall 50 and deflecting member 52 are positioned such that when cartridge 12 is pivoted into recorder 10, the surface of drive roller 39 engages the strip chart paper between the narrow gap defined by tension roll 67 and the second edge 64 of guide wall 50, and the narrow gap defined by second tension roll 69 and deflecting member 52. When cartridge 12 is in operative position in recorder 10, that is, when latch bosses 75 and 77 have been secured by latches 85 and 87, shaft 36 of drive roller 39 is generally in alignment with the narrow gaps defined by tension rolls 67 and 69 together with second edge 64 of guide wall 50 and deflecting member 52, such that the strip chart paper wraps around drive roll 39 by approximately 180°, thereby creating a sufficient wrap to advance the paper over printing edge 60. Preferably, roll 69 pinches the paper against roller 39 to prevent slippage. An arcuate notch 107 is formed in each of opposed sidewalls 46 and 47 to permit the shaft 36 of drive roller 39 to pass therethrough to engage the strip chart paper between tension rolls 67 and 69. A curved skirt (not shown) is formed on the inner surface of each of walls 46 and 47 and is shaped to overlap a portion of drive roller 39 to prevent the strip chart paper from being driven inwardly between paper guide 52 and roller 39.

With reference particularly to FIGS. 1 and 2, a method and apparatus for temporarily displacing the pen arm 28 from the recording site defined by printing edge 60 when cartridge 12 is in operative position in recorder 10, provides a generally U-shaped penlift bar 110 having a long arm spanning substantially the entire distance between sidewalls 24 and 23 and two relatively shorter arms perpendicular to the long arm and disposed parallel to the inner surfaces of walls 24 and 23. Penlift bar 110 is pivoted in walls 24 and 23 at the ends of the shorter arms opposite their intersection with its long arm. The long arm of pinlift bar 110 is urged toward walls 46 and 47 of cartridge 12 by a wire spring 112 affixed to sidewall 24 and in contact with one of the shorter arms of pinlift 110; however, the long arm of pinlift bar 110 is prevented from contacting the cartridge 12 by a stop 114 engaging the side of the shorter arm of penlift bar 110 opposite the side thereof in contact with wire spring 112. A penlift cam 117 is molded on each of sidewalls 46 and 47 and has a forward sloping surface which is positioned to engage the long arm of penlift bar 110 when cartridge 12 is pivoted on cartridge guides 79 and 81 toward operative position in recorder 10. When the penlift bar engages penlift cam 117 it will be urged away from the cartridge 12 against the force of wire spring 112 to temporarily displace the pen arm 28 from the recording site to avoid inadvertent damage to the low inertia pen arms 28. The penlift cam 117 on each of sidewalls 46 and 47 further comprises a sloping rear wall which permits the penlift bar 110 to gradually return to its position against stop 114 after the printing edge has passed inwardly of the ends of pen arms 28.

When the cartridge 12 has thus been installed in the recorder 10 in operative position, the chart drive motor 32 may be energized to rotate drive roller 39 to advance the strip chart paper over the printing edge 60, between first tension roll and second edge 64 of guide wall 50, around drive roll 39, through the aperture between second tension roll 69 and the concave surface of deflecting member 52 which deflects the strip chart paper outwardly of the cartridge and strip chart recorder. The pen arms 28 are maintained in contact with the paper as it passes over the printing edge 60 by springs internal to the pen motors. A heating element in the pen arm 28 contacts the paper as it moves over printing edge 60 to create a record along the strip chart paper determined by a signal driving the pen motor.

A leaf spring 123 is affixed to bracket 20 and extends downwardly therefrom to press against the roll 15 to maintain back pressure against the pull of drive roller 39.

It will be appreciated that the strip chart recorder may be disposed to drive the chart horizontally to permit the operator to read the chart in an easier manner.

In accordance with a method of assembling the cartridge 12, and with reference particularly to FIGS. 5 and 6, side walls 46 and 47, guide bosses 71 and 73, latch bosses 75 and 77, guide wall 50, deflecting member 52 and handle 103 are molded integrally of plastic. The roll of strip chart paper 15 is provided wound on axis 15 which is also formed from plastic. Side walls 46 and 47 are separated slightly as the roll of strip chart paper 15 is inserted therebetween (as indicated by arrow 120 in FIG. 6), such that the ends of axis 55 snap into apertures 57. Axis 55 is sufficiently long so that its ends protrude slightly beyond the outer surfaces of side walls 46 and 47. Roll 15 is secured in cartridge 12 by staking over the ends of axis 55 by applying heat thereto. Metal printing edge 60 is affixed to first edge 62 of guide wall 50.

At the time of manufacture, the end of the paper from roll 15 is pre-threaded over printing edge 62 and over the front surface of guide wall 50 and the concave surface of deflecting member 52. Then tension rolls 67 and 69 are snapped into the aperture provided therefor in side walls 46 and 47. Tension rolls 67 and 69 are made of metal and have stepped ends so that they will be held securely between side walls 46 and 47.

It will be appreciated from the foregoing that the present invention provides a cartridge and strip chart recorder such that the cartridge is relatively easy to load in the recorder and to remove when the record medium in spent. The operator need not thread the record medium through the mechanism, since the mere act of inserting the cartridge in the recorder both engages the record medium with the drive means and with the recording means (e.g., the pen or heated stylus). This is especially important for busy medical personnel who are preoccupied with patient care responsibilities.

Although preferred embodiments of the invention have been disclosed for illustrative purposes, it will be appreciated by those skilled in the art that many additions, modifications, and substitutions are possible, without departing from the scope and spirit of the invention as defined in the accompanying claims.

What is claimed is:

1. A cartridge for supplying a record medium to a recording device, comprising:
   a frame adapted to be mounted releasably in the recording device;
   a supply of the record medium supported by the frame to be dispensed therefrom; and
   securing means on the frame for releasably engaging the recording device to maintain the cartridge in operative relation therewith, comprising:
   a first support boss for engaging a support socket of the recording device; and
   a second support boss spaced from the first support boss for engaging a latch of the recording device to support the first support boss in the support socket.

2. The cartridge of claim 1, wherein the first support boss is adapted to pivot about the support socket of the recording device to bring the second support boss in position to engage the latch of the recording device.

3. The cartridge of claim 1 or 2, wherein the frame comprises a cam surface positioned to displace a recording member of the device from the record medium while the cartridge is being inserted into the recording device and permit engagement of the recording member with the recording medium upon complete insertion of the cartridge into the recording device.

4. The cartridge of claim 1 or 2, further comprising a pair of tension rollers rotatably mounted on the frame and positioned to urge the recording medium against a drive means of the recording device.

5. The cartridge of claim 4, further comprising a deflecting member positioned to intercept the record medium from the drive means and deflect the record medium from the cartridge and recording device.

6. A strip chart recorder, comprising:
   recording means for producing a record on a record medium;
   advancing means for moving the record medium past the recording means; and
   cartridge securing means for releasably securing a cartridge carrying the record medium;
   the cartridge securing means comprising:
   support means for supporting a pivoting member of the cartridge such that the cartridge is pivotable into an operative position in the strip chart recorder; and
   latch means for engaging a hold member on the cartridge upon pivoting of the cartridge into operative position such that the pivoting member of the cartridge is releasably secured against disengagement with the socket.

7. The strip chart recorder of claim 6, wherein the support means comprises a socket having an aperture facing the latch means and the latch means is operative to resist motion of the pivoting member of the cartridge from the support means through the aperture while the hold member is engaged by the latch means.

8. The strip chart recorder of claim 6 or 7, wherein the latch means comprises at least one pivotable latch arm biased to a latching position and having a cam surface for intercepting the hold member of the cartridge upon pivoting of the cartridge into the operative position and deflecting the latch arm from the latching position to permit the hold member to be engaged by the latch.

9. A method for mounting a cartridge carrying a record medium in a strip chart recorder mechanism having a cartridge securing means for releasably securing a cartridge therein, comprising the steps of:
   engaging a pivoting member of the cartridge with a support member of the mechanism;
   pivoting the cartridge about the support member into an operative position in the mechanism; and
   releasably securing the cartridge against disengagement from the operative position in the mechanism.

10. The method of claim 9, wherein the step of engaging the pivoting member with the support member comprises passing the pivoting member through an aperture of the support member into a socket thereof.

11. The method of claim 10, wherein the step of releasably securing the cartridge against disengagement comprises engaging a hold member on the cartridge in a latch means of the recorder such that motion of the pivoting member from the support means through the aperture is resisted while the hold member is engaged by the latch means.

12. The method of claim 9, wherein the step of pivoting the cartridge into an operative position comprises temporarily displacing a recording means of the strip chart recorder from a recording site at which the recording means engages the record medium.

* * * * *

UNITED STATES PATENT AND TRADEMARK OFFICE
CERTIFICATE OF CORRECTION

PATENT NO. : 4,284,252
DATED : August 18, 1981
INVENTOR(S) : Phillip W. King

It is certified that error appears in the above-identified patent and that said Letters Patent are hereby corrected as shown below:

Column 1, line 10, the word "for" (first occurrence) should read -- find --;

Column 2, line 16, the word "the-" should read -- the --; i.e. the dash should be deleted;

Column 2, line 17, the word "socket" should read -- support means --;

Column 5, lines 59, 62 and 63, the word "pinlift" in each line should read -- penlift --;

Column 6, line 62, the word "in" should read -- is --;

Claim 6, line 17, the word "socket" should read -- support means --;

Claim 8, line 8, the word "latch" should read -- latch means --.

Signed and Sealed this

Eighth Day of December 1981

[SEAL]

Attest:

GERALD J. MOSSINGHOFF

Attesting Officer     Commissioner of Patents and Trademarks